United States Patent Office 3,700,588
Patented Oct. 24, 1972

3,700,588
NOVEL HYDROREFORMING CATALYSTS AND A METHOD FOR PREPARING THE SAME
Joseph Edouard Weisang and Philippe Engelhard, Le Havre, France, assignors to Compagnie Francaise de Raffinage, Paris, Seine, France
No Drawing. Filed Feb. 13, 1970, Ser. No. 11,325
Claims priority, application France, Feb. 14, 1969, 6903646
Int. Cl. C10g 35/08; B01j 11/78, 11/08
U.S. Cl. 208—139  8 Claims

ABSTRACT OF THE DISCLOSURE

Novel hydroreforming catalysts are disclosed which improve the reforming of hydrocarbon feeds. These novel catalysts are a combination of the platinum group metals with tin and/or lead.

This invention relates to hydroreforming catalyst compositions, more particularly this invention relates to modifying a hydroreforming catalyst such as platinum by adding thereto lead or tin and obtaining unexpectedly surprising results.

It is known that hydroreforming is a process employed in the petroleum industry to increase the octane number of distillate fractions without substantially modifying the volatility thereof. More particularly it is used for gasolines tailored to meet the trend of increasing the compression ratios of engines, a trend which results in the necessity of using fuels having a high octane number.

The reactions which take place in a hydroreforming process constitute a very complex group of reactions. However, it can be said schematically that batchwise hydroreforming tends to favor, as a group the dehydrocyclization reactions, to limit the cracking reactions and to produce in variable proportions isomerization, dehydrogenation, cyclization and alkylation reactions.

The batchwise hydroreforming is effected in the presence of a catalyst. The most widely used catalysts consist of a metal of the platinum group, in general platinum and sometimes palladium, supported on a refractory inorganic oxide of high specific surface, for instance alumina. The metals of the platinum group are: ruthenium, rhodium, palladium, osmium, iridium and platinum. It is known that the support mentioned above must have "acid" sites on its surface such as of the Bronsted or the Lewis type (i.e. a protonoid reagent). The measure of the acidity of the support characterizes the presence and the importance of the number of these sites. This acidity can be increased by a treatment which the support is subjected to prior to the deposit and which consists, for instance, in fixing acid ions on the support. The attachment of the metal on the support is effected by means of any known method, the one most generally used being impregnation.

An improvement in the hydroreforming process consists in injecting chlorine into the reactor so as to increase the effectiveness and life of the catalyst.

Although the amount of platinum which the catalyst contains is in general less than 1% of the total weight of the catalyst, the price of the platinum is very high; hence, platinum constitutes a very important part of the capital investment in a hydroreforming unit.

The object of the present invention is to decrease the price of the hydroreforming catalyst by the use of a new catalyst.

Another object of the present invention is to obtain a catalyst of satisfactory life which assures process effluxes with a constant, high octane number.

The present discovery has led to the surprising conclusion that in a hydroreforming catalyst composition a metal of the platinum group can be partially replaced by metal such as lead or tin. This result is particularly unexpected, especially with respect to lead, which was considered a catalyst poison; now, it has been established that not only is the presence of lead alongside of platinum harmless either in respect to the effectiveness or to the life of the catalyst, but, rather, it increases the performance and characteristic properties of the catalyst. There is no necessity of pointing out the economic interest of this discovery which becomes immediately evident upon a comparison of the price of platinum on the one hand and of lead or tin on the other hand.

Thus, the object of the present invention is catalysts composed of a support of refractory inorganic oxide of a specific surface of more than 15 m.$^2$/g., of a pore volume of more than 0.1 cm.$^3$/g., and of metals in free or combined form deposited on said support, the said catalysts being characterized by the fact that the said metals consist of:

(a) 0.02 to 2%, referred to the total weight of the catalyst, of at least one metal belonging to the platinum group and (b) 0.02 to 2%, referred to the total weight of the catalyst, of at least one metal belonging to the group consisting of lead and tin.

Another object of the present invention is the process for the production of catalysts in accordance with the invention.

The catalyst support in accordance with the invention has the customary characteristics of hydroreforming catalyst supports. The refractory inorganic oxides of a specific surface of more than 15 m.$^2$/g. and of a pore volume of more than 0.1 cm.$^3$/g. which have Brönsted or Lewis acid sites are suitable as a support. It is known, as a matter of fact, that the existence of such sites, protons in one case and defective electrons in the other case, favors the hydroreforming of the material being treated. By way of nonlimitative examples of supports, mention may be made of the aluminas and aluminosilicates.

It may be advantageous to subject the support before deposition of the metals thereon to a suitable treatment intended to increase the number of acid sites which its surface has.

The metal of the platinum group is deposited on the support in a quantity less than that present on the customary hydroreforming catalysts. In the case of platinum, this amount varies between 0.02 and 2% of the total weight of the catalyst and preferably between 0.1 and 0.7%.

The metal selected from the group consisting of lead and tin is deposited in a quantity within the same limits as those of the metal of the platinum group.

For the purpose of simplifying the description of the invention, mention is merely made of one metal of the platinum group and one metal belonging to the group consisting of lead and tin; however, the combinations, within the limits of the quantities indicated do function in the indicated manner and as a consequence, metals of the platinum group on the one hand and of lead and tin on the other hand, fall within the scope of the invention.

Catalysts in accordance with the invention, produced on an alumina support and composed of an amount of platinum between 0.1 and 0.7% and an amount of lead or tin of between 0.05 and 0.6%, referred to the total weight of the catalyst, have given outstanding results which are better than those obtained by the use of the catalysts customarily employed. It is noted in particular that the conversion of a paraffin feed is close to 100%, the cracking less than 10%, and the isomerization between 1 to 6%; the dehydrocyclization constitutes the main reaction. The novel catalysts produce from a naphthene or paraffin feed a high proportion of aromatic hydrocarbons.

The process perfected for producing the novel catalysts consists in depositing the metal of the platinum group and the metal of the group consisting of lead and tin by impregnation of a support with a solution containing the elements to be deposited. The impregnation solution can be obtained by mixing the solutions each containing a metal to be deposited. This method can be used when the production of such a mixture is not accompanied by the appearance of a cloud, gel or precipitate, which may be avoided sometimes by acidification of the solution.

The metals can also be deposited in succession on the support by effecting the impregnations in different solutions containing the metals to be deposited.

The support must have a sufficiently high specific surface; it is generally between 15 and 350 m.$^2$g. The impregnation can be effected by any known means. In particular, by contact of the solution containing the elements to be deposited with the support, with or without circulation of the solution, followed by evaporation in a rotary evaporator or without evaporation.

One particular embodiment of the process carried out by the applicant consists in starting from alumina available on the market of a specific surface of between 100 and 300 m.$^2$/g., of a pore volume of between 0.4 and 0.8 cm.$^3$/g., which is in the form of small beads of a diameter of between 1 and 10 mm., preferably between 1 and 4 mm., effecting a calcining in the presence of air between 400 and 800° C., and preferably between 450 and 650° C., and then an acidification in liquid phase by means of a dilute acid of a normality of between 0.05 N and 3 N, for instance deci-normal hydrochloric acid. The support which has been prepared in this manner is centrifuged and placed, without prior drying, in the presence of a solution of hexachloroplatinic acid and of lead nitrate in quantities such as to obtain the desired final contents of one and the other metal on the alumina. The concentrations are generally between 0.2 and 5 g./l.

The determination of these quantities is facilitated by two observations:

First, the platinum contained in the solution is generally fixed entirely on the support, Second, after a certain period of time, generally several hours, a concentration equilibrium is established between the quantity of metal belonging to the group consisting of lead and tin fastened on the support and the quantity of said metal remaining in the solution.

After centrifuging, drying and calcining in air between 250 and 550° C., the catalyst of the invention can be used.

Another particular embodiment of the method consists in depositing lead on an alumina calcined at 600° C. by impregnation with a solution of lead nitrate, drying the impregnated alumina and calcining it at 400° C., and then acidifying it by means of a deci-normal solution of hydrochloric acid, and finally depositing platinum by an impregnation of the alumina, followed by a drying and a calcining at 400° C.

The invention is furthermore illustrated by the following examples which are not limitative in character.

EXAMPLE I

A so-called macroporous commercial alumina which has the following textural characteristics is used as a starting material:

Specific surface 203 m.$^2$/g.
Pore volume: 0.441 cm.$^3$/g.
Average radius of the pores: 43 A.

This alumina is present in the form of beads of a diameter of between 2 and 5 mm. It is subjected to a calcining in air at 600° C. for 8 hours, whereupon it is immersed in a deci-normal solution of hydrochloric acid in the amount of 100 g. of solution per 250 cc. of alumina. The solution is circulated; after 24 hours it is noted that its pH no longer changes. After centrifuging, the support alumina is then ready for the depositing.

As control catalyst, there is also prepared an ordinary catalyst labeled I by depositing only platinum on the support alumina. Beads of support alumina are immersed in a hexachloroplatinic acid solution of 3 g./l. of platinum for 16 hours. After centrifuging and drying the beads at 120° C. for 24 hours, they are subjected to calcining in the presence of air for 3 hours at 400° C. The platinum deposited represents 0.75% of the total weight of the catalyst; the chlorine represents 1.18% of the total weight of the catalyst.

Further, three catalyst compositions $A_1$, $A_2$, and $A_3$ are prepared in accordance with the invention. The catalyst $A_1$ is prepared by immersing support alumina beads for 16 hours in a solution of hexachloroplatinic acid titrating originally 2.28 g./l. of platinum and of lead nitrate titrating originally 0.99 g./l. of lead. These beads are centrifuged dried, and calcined by the methods described above. The catalysts $A_2$ and $A_3$ are prepared in the same manner. The respective final contents of platinum and lead, measured with respect to the total weight of the catalyst, are 0.60% and 0.20% for catalyst $A_1$, 0.4% and 0.2% for catalyst $A_2$, and 0.3% and 0.3% for catalyst $A_3$.

A catalyst B, also prepared in accordance with the invention, is further prepared by a method identical to that used for the preparation of the A catalysts but using tin chloride at a concentration of 0.66 g./l. of tin instead of lead nitrate and sufficiently acidifying the impregnation solution to avoid the precipitation of the tin. The respective final contents of platinum and tin, measured with respect to the total weight of the catalyst, are 0.57% and 0.17%. The chlorine contents of the catalysts $A_1$, $A_2$, $A_3$, and B are between 1.10 and 1.35% of the total weight of the catalyst.

The control catalyst I and the catalysts $A_1$, $A_2$, $A_3$ and B are subjected to the following catalytic test: pure hydrogen is passed at atmospheric pressure over 2 cc. of catalyst arranged in a small reactor maintained at 520° C. for 2½ hours, followed by hydrogen saturated with heptane at a temperature of 20° C. The hourly space speed of the liquid heptane is 0.5; this speed measures the volume of liquid normal heptane passing over one unit volume of catalyst per hour. The hourly spaced speed of the gas is 80. The heptane is present in the mixture in a proportion of 2.5%. The sulfur content of the heptane is less than 1 p.p.m. At the outlet, a valve permits injecting the effluent into a gas-phase chromatograph.

The results obtained with the control catalyst I on the one hand and with the catalysts $A_1$, $A_2$, $A_3$ and B in accordance with the invention on the other hand have been entered in Table I.

| Catalyst | Characteristic values of the efflux (percent by wt. of the feed) | Time of operation (in hours) | | | | |
|---|---|---|---|---|---|---|
| | | ¼ | 1 | 3 | 5 | 8 |
| Control I | $C_1$-$C_4$ | 16.2 | 17.0 | 17.9 | 20.1 | 21.4 |
| | $C_7$ | 0 | 0 | 1 | 1.5 | 3.4 |
| | $C_5$* | 83.8 | 83.0 | 82.1 | 78.4 | 75.2 |
| | N.O.R.* | 121.9 | 121.7 | 119.2 | 118.1 | 112.8 |
| $A_1$ | $C_1$-$C_4$ | 11.2 | 9.2 | 8.8 | 8.6 | 8.3 |
| | $C_7$ | 0 | 0 | 0.4 | 0.5 | 1.3 |
| | $C_5$* | 88.8 | 90.8 | 90.8 | 90.9 | 90.4 |
| | N.O.R. | 122.2 | 122.4 | 121.8 | 121.8 | 120.3 |
| $A_2$ | $C_1$-$C_4$ | 13.6 | 14.0 | 14.2 | 13.2 | 14.9 |
| | $C_7$ | 0 | 0 | 0 | 0 | 0.2 |
| | $C_5$* | 86.4 | 86 | 85.8 | 86.8 | 84.9 |
| | N.O.R. | 121.6 | 121.1 | 121.4 | 121.3 | 120.5 |
| $A_3$ | $C_1$-$C_4$ | 14.2 | 14.5 | 14.9 | 15.6 | 16.1 |
| | $C_7$ | 0 | 0 | 0.3 | 0 | 0.4 |
| | $C_5$* | 85.8 | 85.5 | 84.8 | 84.4 | 83.5 |
| | N.O.R. | 121.3 | 121.7 | 120.7 | 121.1 | 120.3 |
| B | $C_1$-$C_4$ | 8.6 | 7.8 | 8.0 | 7.7 | 8.8 |
| | $C_7$ | 0 | 0.1 | 0.3 | 0 | 0.6 |
| | $C_5$* | 91.4 | 92.1 | 91.7 | 92.3 | 90.4 |
| | N.O.R. | 122.8 | 122.7 | 122.3 | 122.9 | 121.4 |

*N.O.R. = Research Octane Number.

For each of the catalysts there has been indicated corresponding to the number of hours of operation five values, and in respect to the composition of the efflux (a) hydrocarbons having four or less than four carbon atoms, (b) heptane and (c) hydrocarbons having five and more than five carbon atoms. From the mixture numbers, the research octane number is calculated from the efflux into a gas-phase chromatograph.

A comparison of the results shows the advantages which the novel catalysts demonstrate over the control catalyst, even when their content of metal of the platinum group is low as compared with their content of metal of the group consisting of lead and tin.

EXAMPLE II

A control catalyst II is prepared in accordance with the method described in Example I for the control catalyst I. The deposited platinum represents 0.75% of the total weight of the catalyst.

In accordance with the invention, a catalyst C is then prepared by the method described in Example I for the A catalysts. The respective final contents of platinum and lead, measured with respect to the total weight of the catalyst, are 0.62% and 0.20%.

The control catalyst II and the catalyst C undergo the following catalytic test: pure hydrogen is passed at 500° C. for 2½ hours over 30 cc. of catalyst placed in a stainless steel reactor, followed by hydrogen and normal heptane; the hourly space speed of the liquid heptane is equal to 1; the hydrogen/normal heptane molar ratio is fixed at five and the pressure in the reactor is 7 bars. The sulfur content of the normal heptane is less than 1 p.p.m.

At the output from the reactor and after expansion, the efflux is cooled to $-80°$ C., which makes it possible to collect the hydrocarbons having 5 and more than 5 carbon atoms and to analyze them by gas phase chromatography. By means of the mixture numbers, the research octane number (N.O.R.) is calculated on basis of the weight balance obtained from the gas phase chromatograph. The reactor temperature is regulated in such a manner that the research octane number remains substantially constant. The weighing of the fraction comprising five and more than five carbon atoms permits the calculation of the yield.

The results obtained with the control catalyst II and with the catalyst C in accordance with the invention have been entered in Table II.

TABLE II

| | Catalyst | | | | | | | |
|---|---|---|---|---|---|---|---|---|
| | Control II | | | | C | | | |
| Number of hours of operation | 20 | 42 | 113 | 202 | 20 | 42 | 113 | 202 |
| Research octane number | 102.1 | 95.3 | 91.7 | 90.0 | 110.6 | 106.3 | 99.7 | 96.3 |
| Temperature (° C.) | 500 | 502 | 514 | 527 | 500 | 500 | 500 | 509 |
| Yield C₅+ (percent by wt. of the feed) | 51.3 | 54.7 | 54.9 | 51.6 | 59.4 | 60.5 | 58.8 | 56.3 |

For each of the catalysts there has been indicated four values corresponding to the number of hours of operation, the temperature of the reactor necessary for obtaining a given research octane number and the yield calculated by weight on the sum of the hydrocarbons having 5 and more than 5 carbon atoms ($C_5+$). The value of this yield can be interpreted as a measure of cracking.

The comparison of the results obtained by the two catalysts demonstrates the advantages of the C catalyst with respect not only to the research octane number but also the operating temperature and the yield.

EXAMPLE III

A hydroreforming catalyst D in accordance with the invention is prepared by the method described in Example I for catalysts A; there is thus obtained a catalyst comprising 0.60% platinum and 0.20% lead, referred to the total weight of the catalyst.

Pure hydrogen is passed at 500° C. for 2 hours over 200 cc. of catalyst, followed by hydrogen and a feed consisting of a hydrodesulfurized heavy gasoline cut having the following properties:

Density at 15° C. _____ 0.729
Initial distillation point and end point (ASTM spectification) _____° C.___ 80–165
Volumetric composition detected by PONA analysis (percent):
    Paraffins _____ 65.0
    Naphthenes _____ 26.1
    Aromatics _____ 8.9
Sulfur content _____p.p.m.___ <1

The pressure is fixed at 7 or 14 bars depending on which one of the values is more favorable for the operation of the catalyst under the conditions of the test. The hourly space speed is fixed at 1. The temperature of the reactor is adjusted so as to obtain a constant research octane number.

In Table III there have been entered the results obtained with an ordinary hydroreforming catalyst designated control III available on the market and having 0.75% platinum and 0.80% chlorine deposited on an alumina support and the results obtained with catalyst D.

TABLE III

| | Catalyst | | | | |
|---|---|---|---|---|---|
| | Control III | | | D | |
| Number of hours of operation | 97 | 205 | 86 | 180 | 285 |
| Research octane No | 95.8 | 95.4 | 100.9 | 96.4 | 96.8 |
| Operating conditions: | | | | | |
|   Temperature (° C.) | 502.5 | 508 | 500.5 | 499.3 | 511.2 |
|   Pressure (bars) | 14 | 14 | 7 | 7 | 7 |
| Ratio of the volumes: | | | | | |
|   H₂ inlet/feed | 146.3 | 146.4 | 147 | 153.9 | 154.3 |
|   Hydrocarbons outlet/feed | 174.3 | 187.2 | 196.9 | 193.4 | 198.3 |
| Products per 100 g. of feed: | | | | | |
|   Stripped liquid product | 70.73 | 71.58 | 69.07 | 74.38 | 71.01 |
|   H₂ formed | 0.56 | 0.91 | 1.93 | 1.48 | 1.70 |
| Hydrocarbons in the vapor phase: | | | | | |
|   In C₁ | 3.45 | 3.47 | 2.58 | 2.04 | 1.45 |
|   In C₂ | 4.49 | 4.80 | 3.84 | 2.82 | 3.15 |
|   In C₃ | 6.92 | 6.61 | 6.01 | 4.74 | 4.50 |
|   In C₄ | 8.48 | 7.62 | 7.55 | 5.82 | 5.54 |
|   In C₅ | 3.70 | 3.22 | 5.15 | 4.30 | 5.54 |
|   In C₆ | 1.68 | 1.79 | 3.87 | 4.42 | 7.11 |
|   Total | 100.00 | 100.00 | 100.00 | 100.00 | 13.00 |
| Yield C₅+ (percent wt. of the feed) | 76.11 | 76.59 | 78.09 | 83.10 | 83.66 |

For each of the catalysts corresponding to the number of hours of operation certain values are indicated representing (a) the research octane number, (b) the temperature of the reactor, (c) pressure, (d) the ratio of the volume of gaseous hydrogen (measured in liters reduced to normal conditions per hour) to the volume of the liquid feed (measured in liters) at the inlet of the reactor, (e) the reactor of the volume of gas to the volume of liquid at the outlet of the reactor, (f) the stripped product which contains the hydrocarbons of five and more than five carbon atoms, (g) the hydrocarbons collected with the hydrogen, and (h) the yield of hydrocarbons of five and more than five carbon atoms ($C_5+$) calculated with respect to the feed.

A comparison of the results demonstrates the advantages which the catalysts of the invention have over the customary hydroreforming catalysts. It should be noted that the employed temperature, the quantity of hydrogen formed, the $C_5+$ yield and the octane number are more advantageous; therefore, the use of the catalysts of the invention results in a better stability over a period of time, of the catalysts, weaker cracking reactions and more extensive isomerization reactions.

EXAMPLE IV

Alumina beads of a diameter of between 2 mm. and 5 mm. and having the following textural characteristics:

Specific surface: 259 m.²/g.
Pore volume: 0.555 cm.³/g.
Average radius of the pores: 43 A.

are subjected to calcining at 600° C. in air for 8 hours.

Tin is deposited on the alumina by impregnation thereof with a very acid solution of tin chloride in an amount of 3.5 g./l. of tin. 500 cc. of this solution are evaporated in a rotary evaporator in the presence of 500 g. of alumina. The alumina supporting the tin is then dried at 120° C. and then calcined in the presence of air for 2 hours at 600° C.; thereupon it is immersed for 24 hours in a deci-normal solution of flowing hydrochloric acid. The platinum is then deposited on the support by impregnating with a solution of hexachloroplatinic acid; the entire amount of platinum is deposited on the alumina.

The catalyst is dried for 24 hours at 120° C. and then calcined for 3 hours at 400° C. in air.

The composition, referred to the total weight of this catalyst, referred to as catalyst E, is 0.35% platinum, 0.35% tin and 1.43% chlorine.

The catalyst E, as well as an ordinary catalyst available on the market, referred to as control catalyst IV, consisting of platinum deposited on alumina, the platinum and chlorine content of which is 0.60% and 0.90%, respectively, are subjected to the following catalysis test:

A volume of 300 cc. of catalyst is placed in a steel reactor. The average temperature of the catalyst is slowly brought from room temperature of the catalyst to 525° C., while pure hydrogen is passed over the catalyst at a pressure of 7 bars, up to 400° C., which temperature is maintained for 1 hour, then up to 525° C. a mixture of hydrogen and of a feed consisting of a distillation cut of an Iraq crude oil the properties and composition of which are as follows:

| | |
|---|---|
| Initial boiling point (ASTM) ° C. | 67 |
| End point (ASTM) ° C. | 159 |
| Density at 20° C. | 0.725 |
| Molecular weight (API nomographs) | 105 |
| Volumetric composition (percent): | |
|     paraffins | 67.7 |
|     naphthenes | 24.7 |
|     aromatics | 7.6 |
| Sulfur content p.p.m. | <1 |

After the increase in temperature and the reduction of the catalyst, the temperature thereof is maintained at 525° C. Hydrogen and the feed described above are introduced into the reactor in such a manner that the molar ratio of hydrogen and feed is equal to 7, the hourly space velocity of the liquid feed being 1.5 and the pressure in the reactor being maintained at 7 bars.

The catalysis test is continued without interruption for 144 hours, without modification of the conditions of feed of the reactor and the operation thereof. The average temperature of the catalyst in particular is maintained at 525° C. The hydrogen introduced with the feed is exclusively a recycled hydrogen which is obtained by expansion of the gases emerging from the reactor; it comprises at least 70% pure hydrogen expressed in number of mols.

In Table IV below there are set forth the results of this catalysis test for the control catalyst IV and the catalyst E in accordance with the invention. There have been entered in succession in this table:

the number of hours of operation
the average temperature of the catalyst
the research octane number of the liquid fraction obtained, measured without addition of tetraethyl lead
the yield of hydrocarbons having five and more than five carbon atoms, expressed in volume, referred to the feed
the ratio of the volume of hydrogen formed (measured in liters under normal conditions) in volume of feed introduced (measured in liters in liquid state at 20° C.)
the composition of the liquid efflux (expressed in volume).

The conclusions which can be drawn from the comparison of the results obtained by the two catalysts are similar to those of Example III.

TABLE IV
Comparison of Catalyst Activity

| | Catalyst | | | | | | | | | | | |
|---|---|---|---|---|---|---|---|---|---|---|---|---|
| | Control IV | | | | | | E | | | | | |
| Hours of operation | 24 | 48 | 72 | 96 | 120 | 144 | 24 | 48 | 72 | 96 | 120 | 144 |
| Average temperature (° C.) | 525 | 525 | 524 | 525 | 526 | 525 | 526 | 525 | 525 | 524 | 525 | 525 |
| Octane number | 102.5 | 96.6 | 89.2 | 85.4 | 80.7 | 76.7 | 102.5 | 99.3 | 96.0 | 92.7 | 89.0 | 83.4 |
| Yield $C_5+$ (percent) | 71.2 | 76.0 | 80.7 | 83.9 | 86.3 | 89.7 | 70.8 | 73.9 | 78.1 | 80.8 | 83.2 | 85.8 |
| Yield $H_2$ formed (1:1) | 222 | 146 | 130 | 102 | 86 | 51 | 247 | 207 | 179 | 157 | 138 | 119 |
| Paraffins (percent) | 22 | 37 | 44 | 48 | 51 | 53 | 23 | 29 | 36 | 41 | 44 | 48 |
| Naphthenes (percent) | 4 | 7 | 10 | 13 | 16 | 19 | 4 | 5 | 7 | 9 | 12 | 14 |
| Aromatics (percent) | 74 | 56 | 46 | 39 | 33 | 30 | 78 | 66 | 57 | 50 | 44 | 38 |

From the above, it is evident that the results obtained by using the novel catalysts in hydroreforming are unexpectedly advantageous when comparisons are made with conventional catalysts on a number of basis. Hence, the present invention represents a multifaceted contribution in the art of hydroreforming.

The feedstock to be employed in hydroreforming is a light hydrocarbon oil, for example, a naphtha fraction. This naphtha can be either a straight-run or a cracked naphtha boiling in the range 50° C.–250° C. preferably. That feed should contain less than 10 p.p.m. sulfur and preferably less than 1 p.p.m. sulfur; so sulfur should be avoided as a poison for the activity and the stability of the catalyst.

What is claimed:

1. A hydroreforming, substantially noncracking catalyst composition comprising alumina as a porous, refractory inorganic oxide support having a specific surface of more than 15 m.²/gram, a pore volume of more than 0.1 cm.³/gram and having acidic sites obtained by a treatment of said support with hydrochloric acid solution of 0.05 to 3 N until the pH of the solution no longer varies, and on the surface of said support a first metal and a second metal consisting essentially of 0.02 to 2%, by weight of the total weight of the catalyst, at least one metal of the platinum group as said first metal, and 0.02 to 2% by weight of the total weight of the catalyst, a metal selected from the group consisting of lead, tin or a mixture thereof as a second metal.

2. The catalyst as defined in claim 1 wherein the amount of the platinum group metal in the catalyst is between 0.1 to 0.7% by weight of the total weight of the catalyst, and wherein the lead, tin or mixtures thereof constitute 0.05 to 0.6% by weight of the total weight of the catalyst.

3. The catalyst according to claim 1 in which alumina has a specific surface between 100 and 350 m.²/gram.

4. The catalyst composition according to claim 1 and wherein the metals on said support are platinum and tin.

5. In a method of manufacturing a hydroreforming catalyst which comprises of calcining in air, at a temperature of between 400 and 800° C., alumina support of a specified surface of more than 15 m.²/g. and of a pore volume of more than 0.1 cm.³/g.; acidifying said calcined support with a hydrochloric acid solution of a normality of between 0.05 N and 3 N until the pH of the solution no longer varies, the improvement of which comprises:

(a) impregnating first said support with tin by means of a solution having concentrations of between 0.2 and 5 grams per liter of said metal;

(b) calcining the catalyst at a temperature of between 250 and 550° C.;

(c) impregnating next said support with a metal of the platinum group, and (d) calcining again the catalyst at a temperature between 250 and 550° C.

6. In a method of hydroreforming a hydrocarbon feed without substantially cracking the same, the improvement comprising contacting a hydrocarbon feed having less than 10 p.p.m. of sulfur in the presence of hydrogen with a catalyst composition comprising alumina as a porous, refractory inorganic oxide support having a specific surface of more than 15 m.²/gram, a pore volume of more than 0.1 cm.³/gram and having acidic sites obtained by treatment of said support with hydrochloric acid solution of 0.05 N to 3 N until the pH of the solution no longer varies, and on said support a first metal and a second metal consisting of 0.02 to 2% by weight of the total weight of the catalyst of at least one metal of the platinum group as a first metal, and 0.02 to 2% by weight of the total weight of the catalyst of a metal selected from the group consisting of lead, tin or the mixtures thereof as a second metal.

7. In the method as defined in claim 6 and wherein the amount of the platinum group metal in the catalyst is between 0.1 and 0.7% by weight of the total weight of the catalyst, and wherein lead, tin or mixtures thereof is between 0.05 to 0.6% by weight of the total weight of the catalyst.

8. The method as defined in claim 6 and wherein the hydrocarbon feed is a naphtha fraction containing less than 10 p.p.m. sulfur.

References Cited

UNITED STATES PATENTS

| | | | |
|---|---|---|---|
| 3,278,608 | 10/1966 | Clement | 252—466 X |
| 3,511,888 | 5/1970 | Jenkins | 260—673.5 |
| 3,531,543 | 9/1970 | Clippinger et al. | 252—466 X |
| 3,457,162 | 7/1969 | Riedl et al. | 208—139 X |
| 2,861,959 | 11/1958 | Thorn et al. | 252—465 |

CARL F. DEES, Primary Examiner

U.S. Cl. X.R.

252—442, 466 PT